(12) United States Patent
Lin

(10) Patent No.: US 6,367,974 B1
(45) Date of Patent: Apr. 9, 2002

(54) THERMOCOUPLE APPARATUS AND WELL FOR CONTAINERS HAVING A FLANGED ACCESS OPENING

(76) Inventor: Peter Lin, 345 Ivyland Rd., Warminster, PA (US) 18974-2205

(*) Notice: Subject to any disclaimer, the term of this patent is extended or adjusted under 35 U.S.C. 154(b) by 0 days.

(21) Appl. No.: 09/293,902

(22) Filed: Apr. 19, 1999

(51) Int. Cl.[7] .............................. G01K 7/02; G01K 1/10
(52) U.S. Cl. ........................ 374/179; 374/208; 374/150
(58) Field of Search .................................. 374/179, 208, 374/141, 150, 147; 136/221, 232, 233; 403/326, 329, 282, 317

(56) References Cited

U.S. PATENT DOCUMENTS

| | | | |
|---|---|---|---|
| 752,452 A | * 2/1904 | Hohmann | 374/208 |
| 1,743,867 A | * 1/1930 | Poole | 136/242 |
| 3,552,434 A | * 1/1971 | Haenky | 137/556 |
| 4,510,343 A | * 4/1985 | Sivyer | 136/242 |
| 4,528,842 A | * 7/1985 | Brown | 73/61.63 |
| 4,590,326 A | * 5/1986 | Woldy et al. | 136/233 |
| 4,718,776 A | * 1/1988 | Gilland et al. | 374/170 |
| 4,830,515 A | * 5/1989 | Cortes | 374/208 |
| 4,850,717 A | * 7/1989 | Clark et al. | 374/208 |
| 4,984,904 A | * 1/1991 | Nakano et al. | 374/139 |
| 5,137,162 A | * 8/1992 | Fritz | 215/31 |
| 5,249,830 A | * 10/1993 | Calmettes et al. | 285/319 |
| 5,318,363 A | * 6/1994 | Mauric | 374/208 |
| 5,342,126 A | * 8/1994 | Heston et al. | 374/208 |

* cited by examiner

Primary Examiner—Diego Gutierrez
Assistant Examiner—Lydia M De Jesús
(74) Attorney, Agent, or Firm—LaMorte & Associates

(57) ABSTRACT

A thermocouple assembly that is used to monitor the temperature of materials held within a container that has a flanged access port. The assembly includes a thermocouple probe having a base and a shaft that extends from the base. The thermocouple probe can be connected to a remote microprocessor or can contains its own integral microprocessor. A well structure is provided for selectively connecting the thermocouple probe to the container. The well structure contains a platform that is adapted to connect to the flanged access port of the container. A tube extends from one side of the platform and a connector mechanism that extends from the opposite side of the platform.

The thermocouple probe can be removable placed into the well structure so that said shaft of said thermocouple probe passes into the tube of the well structure. Once fully advanced into the well structure, the connector mechanism on the well structure engages the base of the thermocouple probe, thereby retaining the thermocouple probe within the well structure. The well structure thereby serves as an interface that enables the thermocouple probe to attach to the container, while protecting the contents of the container from contamination.

13 Claims, 4 Drawing Sheets

THERMOCOUPLE APPARATUS AND WELL FOR CONTAINERS HAVING A FLANGED ACCESS OPENING

BACKGROUND OF THE INVENTION

1. Field of the Invention

The present invention relates to thermocouple systems that can be attached to a container to measure the temperature of the material held within that container. More particularly, the present invention relates to the thermocouple systems that are deigned to measure the temperature of material within a container without directly contacting that material.

2. Description of the Prior Art

In the manufacture and processing of pharmaceutical products, dairy products and other materials that require a sanitary processing environment, it is common for materials to be transported in stainless steel containers. Once in a processing plant, pharmaceutical solutions are commonly pumped between points using a network of fixed pipes. To simplify processing, it is common for the containers and the pipes to have similarly shaped flanged openings. In this manner, containers can be readily joined to pipes and vise versa so that materials can be readily transferred between mobile containers and stationary piping.

Containers used in the pharmaceutical industry vary widely in shape, size and volume. However, one common aspect of these containers is that they are commonly manufactured from stainless steel. In this manner, the containers can be sterilized in an autoclave if ever used to hold bio-hazardous or bio-active material.

Referring to FIG. 1, there is shown a prior art container 10 and a prior art end cap 12 for that container 10. The container 10 has a neck that extends from the top of the container 10. The neck terminates with a radial flange 14. The shown container 10 serves to exemplify containers commonly used to transport samples in the pharmaceutical industry. As can be seen from FIG. 1, the radial flange 14 is disposed around the open top end 16 of the container's neck. A groove 18 is disposed on the top surface 16 of the flange 14, wherein the groove 18 is shaped to retain part of a gasket 20. The bottom surface 22 of the flange 14 is beveled, thereby providing the flange 14 with a tapered shape.

The end cap 12 shown typifies the type of cap currently used to seal pharmaceutical containers and pharmaceutical piping. The end cap 12 is a solid disk of stainless steel. A groove 24 is formed on the bottom surface of the end cap 12. The groove 24 on the end cap 12 aligns with the groove 18 on the flange 14 of the container 10. A section 26 of the top surface of the cap near the peripheral edge is beveled at the same angle as is the bottom surface 22 of the flange 14 on the container 10.

A gasket 20 is placed between the end cap 12 and the container 10. The gasket 20 fits within the grooves 24, 18 on the bottom of the end cap 12 and the top of the container 10, respectively. A pipe clamp (not shown) is then used to bias the end cap 12 against the container 10. Such pipe clamps are exemplified by co-pending U.S. patent application Ser. No. 09/027,757 to Lin, entitled Spring Biased Clamping Device For Flanged Connections. The pipe clamp compresses the gasket 20 between the end cap 12 and the container 10, thereby making a hermetic seal. Since neither the container 10 nor the end cap 12 contain threads, there are few places for contaminants to hide. Accordingly, both elements are readily cleaned and sterilized using a laboratory autoclave.

Because containers, such as that shown in FIG. 1, are often used to hold pharmaceutical products, such containers often hold sterile or bio-active material. Accordingly, it is not desirable for the materials to be contaminated during storage or transport by the opening of the container. In such scenarios, the containers are not opened to measure the temperature of their contents. Rather, the temperature of the containers' contents is often estimated by measuring the temperature of the exterior of the container. Such temperature measuring techniques are non-obtrusive to the container but do not give a highly accurate reading of the temperature within the container.

Specialized containers do exist where thermocouples are built into the internal structure of the container. Such containers tend to be significantly more expensive than ordinary containers. Furthermore, the systems used to mount the thermocouples in place commonly contain bolts and gaskets. Accordingly, it takes a significant amount of time and labor to remove the thermocouple for repairs or for when the container needs to be sterilized in an autoclave.

A need therefore exists for an improved system for introducing a thermocouple into a container without contaminating the contents of the container, wherein the system is inexpensive and can be retroactively added to most any existing container. Such a need is met by the present invention as described and claimed below.

SUMMARY OF THE INVENTION

The present invention is a thermocouple assembly that is used to monitor the temperature of materials held within a container that has a flanged access port. The assembly includes a thermocouple probe having a base and a shaft that extends from the base. The thermocouple probe can be connected to a remote microprocessor or can contain its own integral microprocessor. A well structure is provided for selectively connecting the thermocouple probe to the container. The well structure contains a platform that is adapted to connect to the flanged access port of the container. A tube extends from one side of the platform and a connector mechanism that extends from the opposite side of the platform.

The thermocouple probe can be removably placed into the well structure so that said shaft of said thermocouple probe passes into the tube of the well structure. Once fully advanced into the well structure, the connector mechanism on the well structure engages the base of the thermocouple probe, thereby retaining the thermocouple probe within the well structure. The well structure thereby serves as an interface that enables the thermocouple probe to attach to the container, while protecting the contents of the container from contamination.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention thermocouple apparatus can be used to measure temperatures in different types of containers, the present invention is especially well suited for use in sealing stainless steel pharmaceutical containers that must maintain sanitary conditions internally. Accordingly, by way of example, the present invention device and system will be described as adapted for use with a stainless steel sanitary pharmaceutical container.

Figure 2:
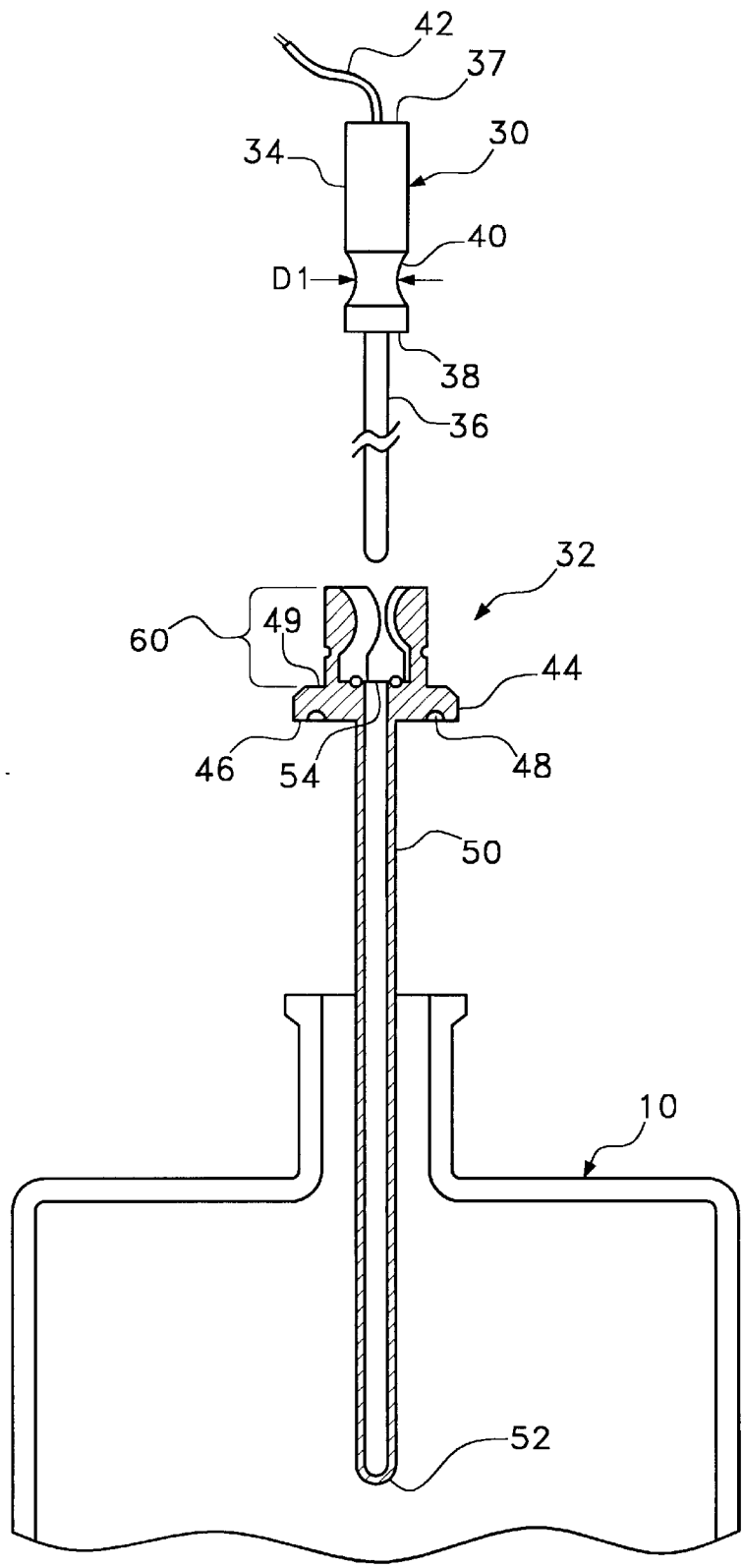
FIG. 2 is a selectively cross-sectioned, exploded view of an assembly consisting of a thermocouple probe, a thermocouple well and a container with a flanged access port.

Referring to FIG. 2, there is shown a thermocouple probe 30, a container 10 and a thermocouple well 32 that is used to introduce the thermocouple probe 30 into the container 10. The thermocouple probe 30 is comprised of a handle 34 and a probe shaft 36 that extends from the handle 34. The handle 34 of the thermocouple probe 30 is basically cylindrical in shape, having a predetermined length that extends between a top end 37 and a bottom end 38. However, a relief 40 is formed in the exterior of the handle 30, wherein the relief 40 begins a predetermined distance from the bottom end 38 of the handle 30. The relief is toric in shape, thereby defining a semicircular depression having a predetermined radius of curvature. At its thinnest point, the semicircular depression has a minimum diameter D1.

The shaft 36 of the thermocouple probe 30 houses thermocouple elements (not shown). Leads 42 extend through the shaft 36 and the handle 34 from the thermocouple elements. The leads 42 extend to a remote controller that reads analog data from the thermocouple elements and calculates an accurate temperature reading from that analog data.

Figure 1:
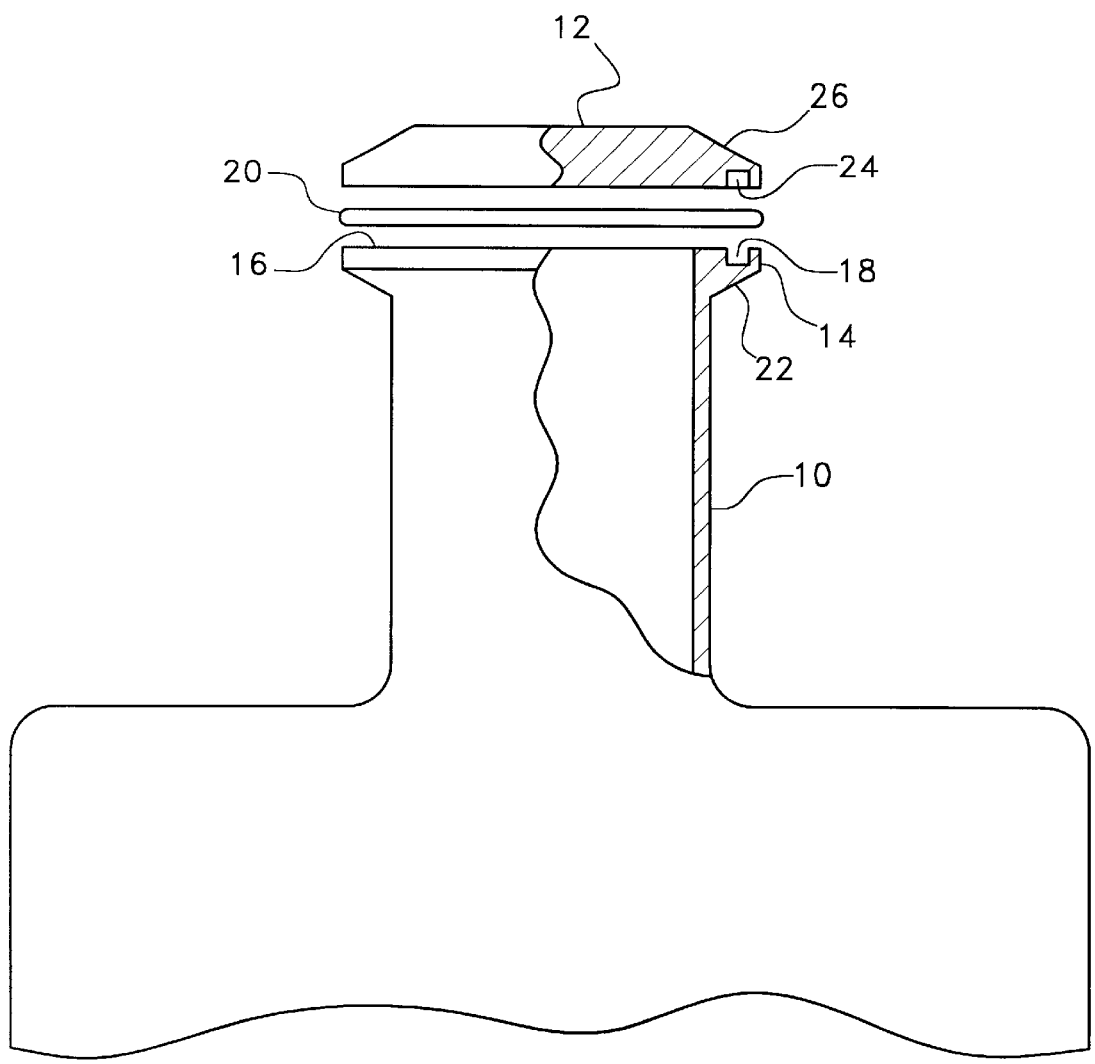
FIG. 1 is a selectively cross-sectioned view of a prior art pharmaceutical container and a prior art end cap typically used to seal such a container.

The thermocouple well 32 is adapted to receive the thermocouple probe 30. The thermocouple well 32 contains a circular platform 44. The platform 44 is shaped similar to the prior art end cap previously described in accordance with FIG. 1. The platform 44 has a flat bottom surface 46. A groove 48 is formed in the bottom surface 46 of the platform 44 near its peripheral edge. The groove 48 is positioned to align with the groove 18 (FIG. 1) on the flanged opening of the container, previously described in FIG. 1.

The top surface 49 of the platform 44 has a beveled peripheral edge. As such, the top surface 49 of the platform 44 slopes downwardly toward the bottom surface 48. The length of the beveled edge and the slope of the beveled edge are the same as are used in the prior art end caps of FIG. 1.

A tube 50 extends from the bottom surface of the platform 44. The tube 50 has a first end that is sealed against the bottom surface 46 of the platform 44 and an opposite second distal end 52. The distal end 52 of the tube 50 is closed. An aperture 54 extends through the center of the platform 44, wherein the aperture 54 communicates with the interior of the tube 50. Accordingly, the only access to the interior of the tube 50 is through the aperture 54 in the platform 44.

Figure 3:
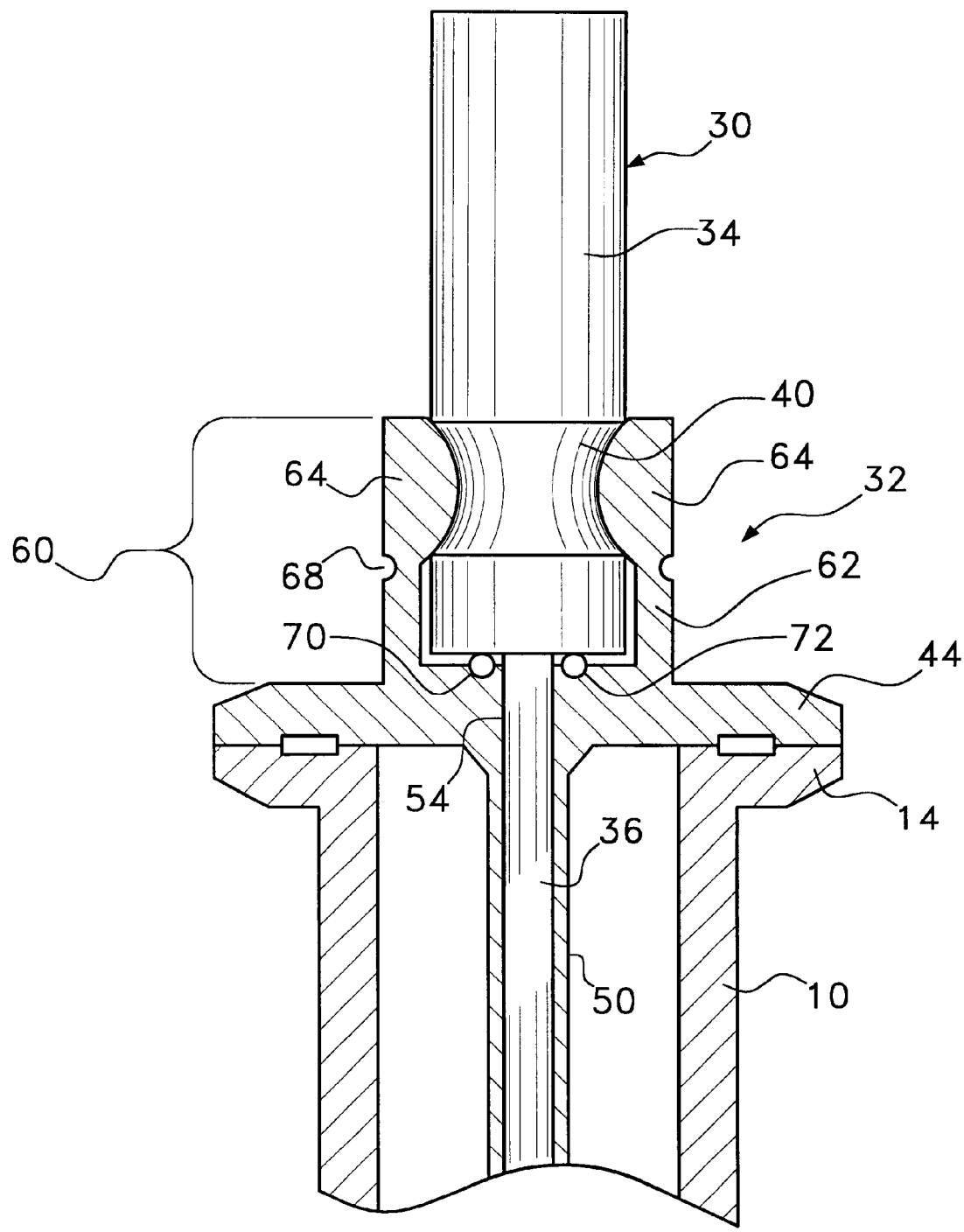
FIG. 3 is an enlarged, selectively cross-sectioned view of the embodiment of FIG. 2, shown in an assembled condition.

A connector structure 60 extends upwardly from the top surface 49 of the platform 44. Referring to FIG. 3, it can be seen that the connector structure 60 contains a cylindrical base region 62. The cylindrical base region 62 is concentrically disposed around the central aperture 54 that extends through the platform 44. A plurality of locking tabs 64 extend upwardly from the top of the cylindrical base region 62. The exterior of the locking tabs 64 are flat. However, the interior or each of the locking tabs 64 is curved into a semicircular shape, having a predetermined radius of curvature. The radius of curvature for the interior of each locking tab 64 is preferable the same as the radius of curvature of the semicircular relief 40 in the handle 34 of the thermocouple probe 30. Similarly, the diameter between the pawls 64 is generally equivalent to the diameter D1 (FIG. 1) of the thermocouple probe handle 34 in the area of the semicircular relief 40.

A semicircular groove 68 is disposed on the exterior of the connector structure 60 in between the cylindrical base region 62 and the locking tabs 64. The presence of the semicircular relief 68 significantly reduces the thickness of the connector structure 60 directly below the locking tabs 64. The locking tabs 64 are therefore more free to elastically flex out of position when biased by an external force.

The cylindrical base region 62 of the connector structure 60 has a bottom surface that is joined to the top surface of the platform 44. An O-ring groove 72 is formed in this bottom surface. The groove 72 encircles the aperture 54 that extends through the platform 44 and extends into the tube 50. An O-ring 70 of the appropriate size is placed in the groove 72.

From the assembly of FIG. 3, it can be seen that the thermocouple well 32 is placed in a flanged opening of a container 10 until the platform 44 of the thermocouple well 32 seats against the pipe flange 14 on the container 10. Once seated, the platform 44 of the thermocouple well can be attached to the container 10 using a pipe clamp (not shown). Once the thermocouple well 32 is attached to the container 10, the tube 50 at the bottom of the thermocouple well 32 extends into the container 10. However, the contents of the container 10 are isolated and there is no exposure of the contents of the container 10.

The thermocouple probe 30 is then inserted into the thermocouple well 32. To insert the thermocouple probe 30, the shaft 36 of the probe 30 is advanced through the platform 44 and into the tube 50 of the thermocouple well 32. As the thermocouple probe 30 is advanced into the thermocouple well 32, the handle 34 of the thermocouple probe 30 contacts the connector structure 60 at the top of the thermocouple well 32. At this point an interference fit occurs between the handle 34 of the thermocouple probe 30 and the locking tabs 64 of the connector structure 60 on the thermocouple well 50. If a sufficient downward force is applied to the thermocouple probe 30, then the handle 34 can be made to temporarily deform the locking tabs 64 outwardly, thereby allowing for the further advancement of the thermocouple probe 30.

As the handle 34 of the thermocouple probe 30 advances into the connector structure 60 of the thermocouple well 32, the locking tabs 64 of the connector structure 60 eventually snap into the semicircular relief 40, thereby locking the thermocouple probe 30 into place. As the locking tabs 64 of the connector structure 60 pass into the semicircular depression 40 of the handle 34, the O-ring 70 at the bottom of the connector structure 60 becomes compressed between the connector structure 60 and the bottom of the handle 34. Accordingly, the shaft 36 of the thermocouple probe 30 becomes sealed within the thermocouple well 32.

To remove the thermocouple probe 30, the handle 34 of the thermocouple probe 36 is pulled upwardly with a force sufficient to again displace the locking tabs 64 on the connector structure 60. Once the locking tabs 64 of the connector structure 60 disengage the semicircular depression 40 on the handle 34, the thermocouple probe 36 is free to be removed from the thermocouple well 32.

Figure 4:
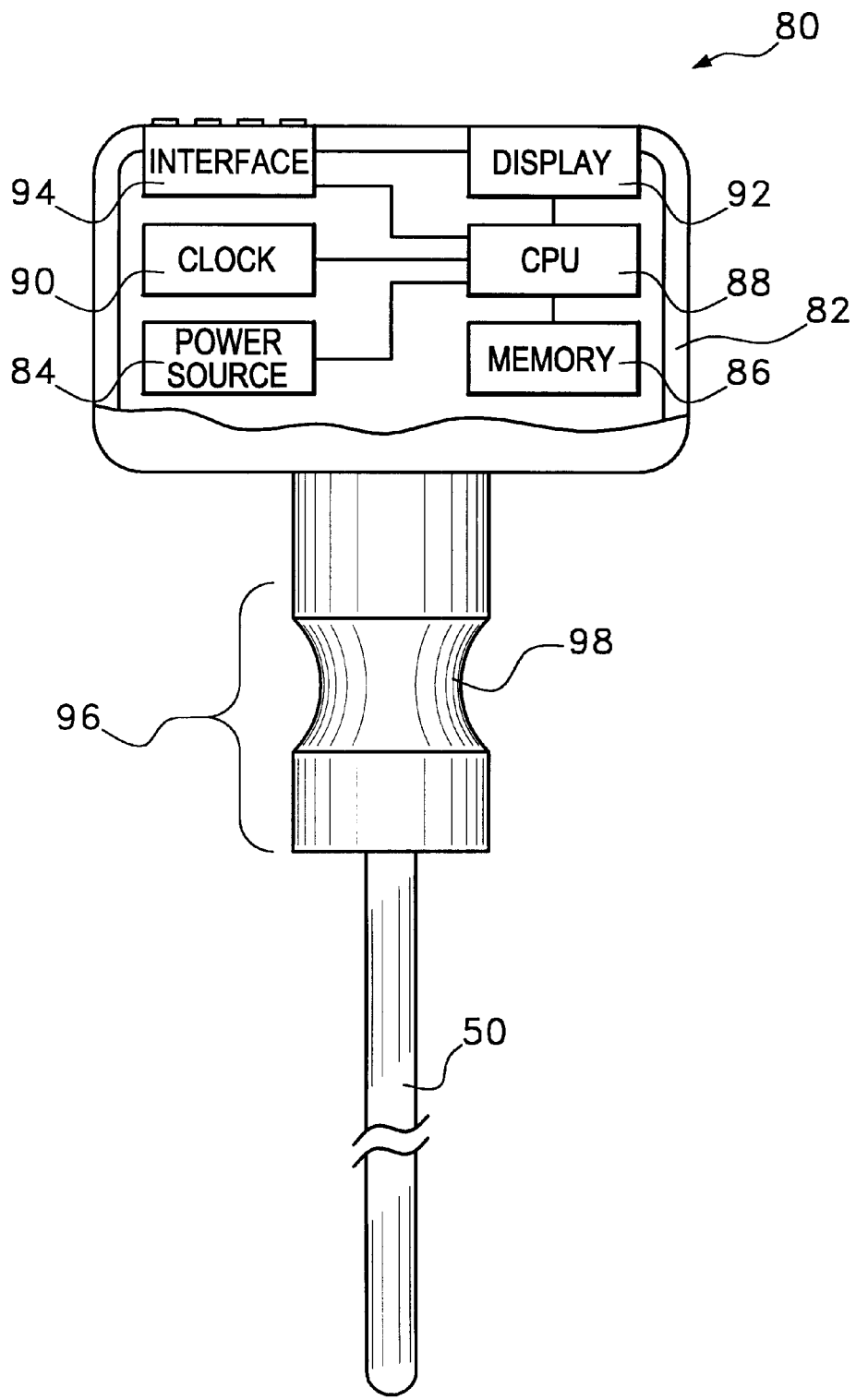
FIG. 4 is a partially cross-sectional/partially schematic view of an alternate embodiment of a thermocouple probe in accordance with the present invention.

Referring now to FIG. 4, an alternate embodiment of a thermocouple probe is illustrated. In this embodiment, the thermocouple probe is part of a self-contained thermocouple module 80. The thermocouple module 80 has an housing 82 at its top end. Within the housing 82 is contained a power source 84, a memory 86, a processor 88, a clock 90, a display 92 and a control interface 94. The processor 88 receives data from the thermocouple elements at the bottom of the thermocouple's shaft 50. The processor 88 records that data as electronically addressed by the clock 90. Accordingly, data corresponding to any period of time can be identified by the time period in which that data was recorded. The display 92 is used to display the data and the control interface 94 is used to manually instruct the processor 88. Although not shown, it should be understood that the thermocouple module 80 can also contain a connector port that would enable the memory to be read by a remote computer device.

The housing 82 of the thermocouple module 90 contains a stem region 96 that is shaped like the handle of FIG. 2. As such, the stem region 96 of the thermocouple module 80 contains a semicircular depression 98 that engages the connector structure 60 (FIG. 3) of a thermocouple well 32 (FIG. 3) in the same manner as has been previously described. Accordingly, the thermocouple probe of FIG. 2 can be selectively interchanged with the thermocouple module of FIG. 4.

Using the thermocouple module 80 of FIG. 4, it will be understood that a full history of temperatures experienced by the material in the container can be recalled from memory. As such, when a container is shipped with the thermocouple module 80, the receiver of the container can check that proper conditions were maintained during the transport of the container. If desired, the thermocouple can then be removed from the container and reused on another container. Since no portion of the thermocouple module 80 comes into contact with the contents of the container, the thermocouple module 80 need not be sterilized prior to it reuse.

It will be understood that the various figures described above illustrate only two preferred embodiments of the present invention. A person skilled in the art can therefore make numerous alterations and modifications to the shown embodiments utilizing functionally equivalent components to those shown and described. For example, there are numerous modifications that can be made to the connector structure of the thermocouple well that would work in the same manner to the embodiments specifically described. All such modifications are intended to be included within the scope of the present invention as defined by the appended claims.

What is claimed is:

1. A thermocouple assembly for attachment to a container having a flanged access port, said assembly comprising:
   a thermocouple probe having a base and a shaft that extends from said base, wherein said base has at least one depression thereon;
   a well structure for selectively connecting said thermocouple probe to the container, said well structure including:
      a platform attachable to the flanged access port of the container;
      a tube that extends from one side of said platform; and
      at least one locking tab that extends from said platform opposite said tube, wherein said thermocouple probe can be removable placed into said well structure so that said shaft of said thermocouple probe passes into said tube of said well structure and said at least one locking tab engages said at least one depression on said base of said thermocouple probe, thereby retaining said thermocouple probe within said well structure.

2. The assembly according to claim 1, wherein said well structure isolates said thermocouple probe and prevents said thermocouple probe from contacting any contents of the container when said assembly is applied to the container.

3. The assembly according to claim 1, wherein well structure is made of stainless steel.

4. The assembly according to claim 1, wherein said platform of said well structure is generally disk-shaped, having a top surface and a bottom surface, wherein said platform is able to be attached to the flanged access port of a container with a pipe clamp.

5. The assembly according to claim 4, wherein a groove is disposed in said bottom surface of said platform, wherein said groove is shaped to receive a gasket.

6. The assembly according to claim 1, wherein an aperture extends through said platform, wherein said aperture leads into said tube that extends from said platform.

7. The assembly according to claim 6, further including an O-Ring disposed around said aperture that seals around said shaft of said thermocouple probe when said shaft is advanced through said aperture and into said tube.

8. The assembly according to claim 1, wherein said at least one locking tab, has a semicircular head section of a predetermined radius of curvature and said at least one depression on said base of said thermocouple probe is a semicircular relief that receives said at least one locking tab therein when said thermocouple probe is fully advanced into said well structure, wherein said semicircular relief has a radius of curvature generally equivalent to said predetermined radius of curvature.

9. The assembly according to claim 1, wherein said thermocouple probe includes an electronic memory for recording temperatures during a predetermined range of time.

10. A thermocouple well device for selectively attaching a thermocouple probe to the flanged access port of a container, said thermocouple well device, comprising:
    a platform having a top surface, a bottom surface and a circular peripheral edge;
    an aperture extending through said platform from said top surface to said bottom surface;
    a tube having a first end coupled to said bottom surface of said platform and a closed second end, wherein said aperture in said platform intersects the interior of said tube;
    a plurality of locking tabs extending upwardly from said top surface of said platform, wherein said plurality of locking tabs are symmetrically disposed around said aperture.

11. The device according to claim 10, wherein said platform, said tube and said plurality of locking tabs are made of stainless steel.

12. The device according to claim 10, wherein said top surface of said platform is beveled at said peripheral edge.

13. The device according to claim 10, further including an O-ring disposed around said aperture on said top surface of said platform.

* * * * *